United States Patent
Prasad et al.

(10) Patent No.: US 8,381,094 B1
(45) Date of Patent: Feb. 19, 2013

(54) INCREMENTAL VISUAL COMPARISON OF WEB BROWSER SCREENS

(75) Inventors: Mukul R. Prasad, San Jose, CA (US); Shauvik Roy Choudhary, Atlanta, CA (US)

(73) Assignee: Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 13/248,027

(22) Filed: Sep. 28, 2011

(51) Int. Cl.
G06F 17/00 (2006.01)
G06F 15/16 (2006.01)

(52) U.S. Cl. ........ 715/234; 715/201; 715/738; 715/854; 709/203; 709/217; 719/318

(58) Field of Classification Search ............... 715/200, 715/201, 205, 209, 226, 234, 273, 735, 736, 715/737, 738, 740, 745, 760, 853, 854; 709/201, 709/202, 203, 204, 205, 206, 207, 212, 217, 709/218, 219, 220, 223, 224, 227, 229; 719/318
See application file for complete search history.

(56) References Cited

U.S. PATENT DOCUMENTS

| | | | | |
|---|---|---|---|---|
| 2010/0088668 | A1* | 4/2010 | Yoshihama et al. | 717/105 |
| 2011/0099491 | A1* | 4/2011 | Abraham et al. | 715/764 |

OTHER PUBLICATIONS

Mesbah, Ali et al., "Automated Cross-Browser Compatibility Testing" International Conference on Software Engineering (ICSE 2011), May 2011.
Choudhary, Shauvik Roy, et al., "WebDiff: Automated Identification of Cross-browser Issues in Web Applications", International Conference on Software Maintenance (ICSM 2010), 2010.
U.S. Appl. No. 12/723,568, filed Mar. 12, 2010, Prasad et al.
U.S. Appl. No. 13/026,899, filed Feb. 14, 2011, Prasad.

* cited by examiner

Primary Examiner — Maikhanh Nguyen
(74) Attorney, Agent, or Firm — Baker Botts L.L.P.

(57) ABSTRACT

A method, media, and systems for performing incremental visual comparison of web browser screens are provided. Structured representations of a current state of an event-driven application are accessed, one with respect to a plurality of client-tier environments. Where the current state is not an initial state of the event-driven application, structured representations of a prior state of the event-driven application are accessed, with respect to each client-tier environment. A set of one or more pairwise equivalences between the current state and the prior state of the event-driven application are determined with respect to each client-tier environment. A set of one or more matched portions between the first and second sets of pairwise equivalences is determined. Finally, one or more differences in a first end-user experience in the first client-tier environment are determined with respect to a second end-user experience in the second client-tier environment.

20 Claims, 13 Drawing Sheets

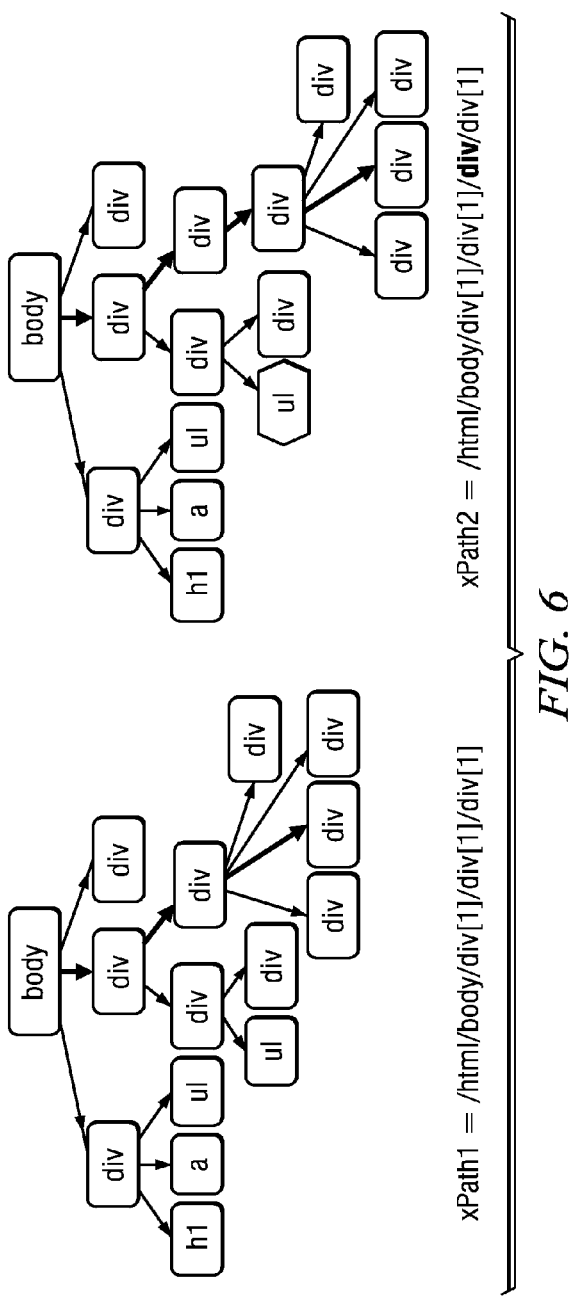

FIG. 8

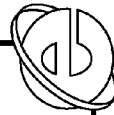
FIG. 11

INCREMENTAL VISUAL COMPARISON OF WEB BROWSER SCREENS

RELATED APPLICATIONS

This application hereby incorporates by reference in its entirety and for all purposes, U.S. patent application Ser No. 13/248,030, filed on 29 Sep. 2011, entitled "Using Machine Learning to Improve Visual Comparison", U.S. patent application Ser. No. 12/723,568, filed on 12 Mar. 2010, entitled "Determining Differences in an Event-Driven Application Accessed in Different Client-Tier Environments" and U.S. patent application Ser. No. 13/026,899, filed on 14 Feb. 2011, entitled "Web Service for Automated Cross-Browser. Compatibility Checking of Web Applications."

INTRODUCTION

The present disclosure relates generally to determining differences in an event-driven application accessed in different client-tier environments.

A web application follows a typical client-server computing model and usually consists of several server and client side components. Server side components get invoked when the web server receives a request (typically, from a remote user through a web browser). As a result of the server side execution, various client side components are dynamically generated and sent back to the web browser in the form of HTML (HyperText Markup Language) pages. These pages, which are rendered by the browser, reference or contain resources such as images, animations, style information (e.g., Cascading Style Sheets (CCS)) and scripts (e.g., JavaScript or VBScript).

A web browser consists of different subsystems that handle various functionality, such as processing the client side components and managing the interactions of these components with system resources (e.g., network, display, file system). In some subsystems of a browser, one of the main components is the layout engine, which is responsible for rendering a web page by parsing the HTML tags in the page and applying to the relevant elements the style information contained in the CSS stylesheets for the page. The browser also maintains a DOM (Document Object Model) representation of the web page in its memory to allow scripts associated with the page to query and modify web page elements. Although there is a standard definition for the DOM format (see http://www.w3.org/DOMf), web browsers often deviate from the standard. Moreover, since most web pages have browser-specific code to make them work on different browsers and platforms, the DOM generated by different browsers can be very different. For this reason, simply comparing the DOM information in different web browsers may not be ideal when comparing web pages rendered in such browsers.

A basic technique for comparing two images is to compare their histograms, where an image histogram represents the distribution of the value of a particular feature in the image. In particular, a color histogram of an image represents the distribution of colors in that image, that is, the number of pixels in the image whose color belongs in each of a fixed list of color ranges (bins). Obviously, if two images are the same, their color distributions will also match. Although the converse is not true, and two different images can have the same histogram, this issue is again not particularly relevant in our problem domain.

Basic histogram-matching techniques find the difference between corresponding bins across two images, which can result in false positives in the case of small shifts. The use of the Earth Movers' Distance (EMD) can alleviate this issue. EMD is a measure of the distance between two distributions and, intuitively, consists of the minimum amount of "work" required to make the two histograms identical by moving around the quantities in the different bins. Because it can ignore small changes in an image, EMD is widely used in computer vision. For the same reason, it is a suitable approach for the problem of comparing the graphical rendering across web browsers, where we want to be able to account for negligible variations while catching larger changes.

Event-driven applications typically may be accessed in different client-tier environments. However, in many cases, a first client-tier environment may provide a different end-user experience of the event-driven application than a second client-tier environment. These types of issues are far from rare because developers tend to use mostly one browser during development and then port the code to other browsers. Even in the case where multiple browsers are considered from the beginning, it is difficult to test for all possible browsers and versions. Moreover, such testing is performed in a mostly manual manner, and is thus extremely time consuming (and often neglected). In fact, cross-browser issues are notoriously considered to be a major problem by most web application developers.

Layout issues are very common in web applications and result in differences in rendering the web page across browsers that are visible to the user. These issues can be classified as differences in element position, size, visibility, or appearance. Differences in positions and size are self explanatory. Differences in visibility consist of an element not being visible in one or more browsers. Finally; we define as differences in appearance when the an element's style or content is different across browsers.

Functionality issues involve the functionality of a web application and are often due to differences in the way the script elements within a web page are executed by different browsers. Functionality issues typically limit the ability of a user to access specific web page elements, such as widgets. Although the users would identify the problem when they try to exercise the affected elements, these issues are sometimes more difficult to identify because they may not have any visible effect (e.g., a button may be displayed correctly even if it does not work).

Non-Compliant Browsers: Although the client side technologies have associated standards, they continue to evolve. At any point in time, there are thus features that are in the specification but are either not implemented or not implemented correctly in some browsers. These problematic features are often known, and there are web sites (e.g., http://quirksmode.org) that maintain a list of such features to help web developers be aware of them and provide suitable workarounds in their code. The check performed at line 6 by the script.js script in FIG. 2 is a typical example of one such workaround.

Extra Features in Browsers: Many browsers implement extra features that are not a part of the standard to provide more flexibility to developers. While web developers try to avoid using these features as much as possible, they do use them for convenience. For example, Internet Explorer supports conditional comments—comments that allow the commented out code to conditionally run in Internet Explorer while being In order to ensure a high-quality user experience, cross-browser testing and regression testing is typically undertaken. However, the conventional manner of performing such testing, which involves a high number of visual comparisons, may be not only time-consuming, but also error-prone.

BRIEF DESCRIPTION OF THE DRAWINGS

FIG. 6 illustrates example structured representations of a screen of an example event-driven application in two different client-tier environments.

FIG. 7 illustrates an example algorithm for comparing a node in a first structured representation with a node in a second structured representation.

FIG. 8 illustrates the screen of an example state of an event-driven application, as viewed in two different client-tier environments, in relation to the structured representation of the state.

FIG. 11 illustrates an identification of nodes in two different client-tier environments for performing visual differencing.

DESCRIPTION OF EXAMPLE EMBODIMENTS

Embodiments disclosed herein provide methods for reducing the number of visual comparisons required when performing cross-browser testing and regression testing of event-driven applications. In some embodiments, for each client-tier environment, a behavioral model of an event-driven application is extracted as a state graph; a structured representation (i.e., DOM tree) of the screen for each state/node for a given client-tier environment is compared against a structured representation of a previously-compared state/node in order to discern which portions changed and which did not. Unchanged portions are removed from the set of nodes for which subsequent visual differencing between client-tier environments is to be performed, thereby reducing the number of duplicative and costly visual comparisons performed.

System Overview

Figure 1:
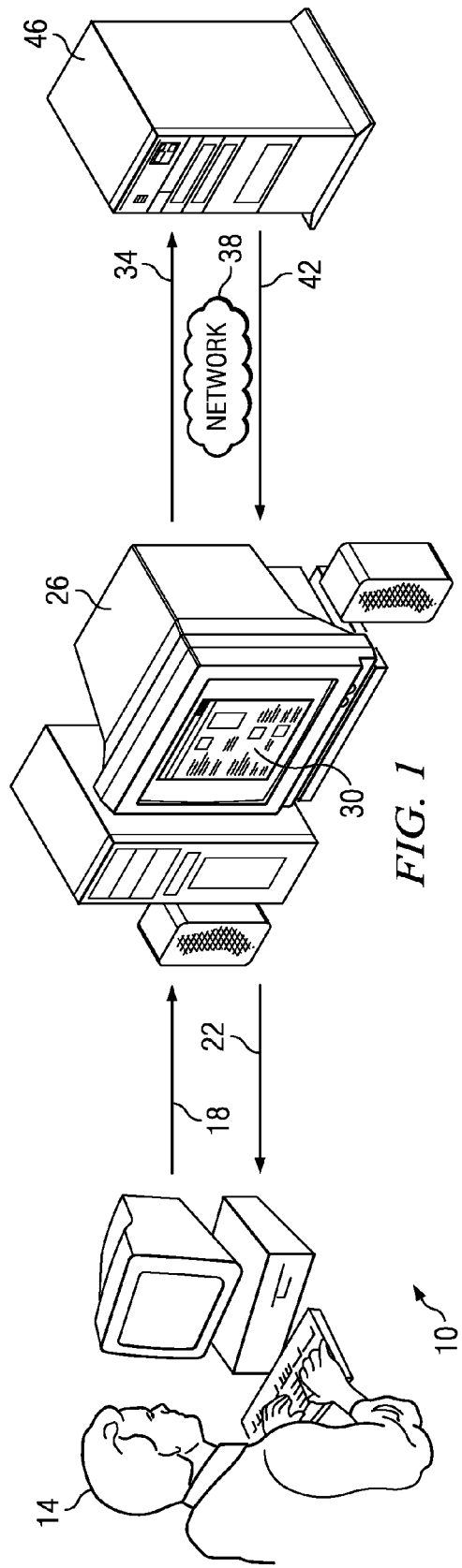
FIG. 1 illustrates an example system for accessing one or more event-driven applications.

FIG. 1 illustrates an example system 10 for accessing one or more event-driven applications 30. System 10 includes a user 14, one or more clients 26, one or more event-driven applications 30, a network 38, and one or more servers 46.

A user 14 may interact with a client 26 to access one or more event-driven applications 30. As an example and not by way of limitation, a user 14 may include a person, a program, a device, an automation, any other suitable entity, or a combination of two or more of these.

A client 26 may send and receive signals to and from one or more servers 46 in order to allow a user 14 to access one or more event-driven applications 30. As an example and not by way of limitation, a client 26 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. A client 26 may send and receive any suitable type of signals for accessing an event-driven application 30. For example and not by way of limitation, a client 26 may send and receive hypertext transfer protocol (HTTP) signals, file transfer protocol (FTP) signals, or any other suitable signals.

A client 26 may further include an I/O interface (not shown) that enables a user 14 to interact with a client 26. As an example and not by way of limitation, an I/O device may include a keyboard, keypad, microphone, monitor, mouse, printer, scanner, speaker, still camera, stylus, tablet, touchscreen, trackball, video camera, another suitable I/O device, or a combination of two or more of these. An I/O interface of a client 26 may provide a user 14 with a viewable display 22 of an event-driven application 30. As an example and not by way of limitation, an I/O device may be a monitor that provides a viewable display 22 to a user 14 by displaying an event-driven application 30 on the monitor. An I/O interface of a client 26 may further allow a user 14 to interact with an event-driven application 30 by allowing a user 14 to perform one or more events 18. An event 18 may include any suitable type of user-initiated event. As an example and not by way of limitation, an event 18 may include clicking a mouse, moving a mouse, pressing one or more keys on a keypad, touching a touchscreen, moving a trackball, speaking into a microphone, any other event that may be initiated by a user 14, or any combination of two or more of these.

A client 26 may further include one or more client-tier environments (not shown). A client-tier environment of a client 26 may allow a user 14 to access one or more event-driven applications 30. As an example and not by way of limitation, a client-tier environment may include an operating system (OS) installed on a client 26, a web browser installed on a client 26, one or more settings of a client 26 (e.g., such as the screen resolution of a monitor of a client 26), one or more variations in a web browser installed on a client 26 (e.g., the version and configuration of the web browser, including one or more web browser plug-ins and one or more web browser settings), or any combination of two or more of these.

An OS installed on a client 26 may run one or more web browsers installed on a client 26. As an example and not by way of limitation, the OS may include a Windows 95/98/NT/XP/Vista/Mobile OS, an OS-X® OS, a UNIX® OS, a LINUX OS, or any other suitable OS. The web browser installed on a client 26 may allow a user 14 to access event-driven applications 30. For example and not by way of limitation, the web browser may include Microsoft® Internet Explorer, Mozilla® Firefox, Google® Chrome, Opera®, or any other suitable web browser. In particular embodiments, the web browser may initiate the transmittal of one or more server request signals 34 from a client 26 to one or more servers 46 over a network 38. A server request signal 34 may be based on one or more events 18 from a user 14 or web flow from an event-driven application 30. As an example and not by way of limitation, a user 14 may enter an address for an event-driven application 30 (e.g., such as a uniform resource locator (URL) or a uniform resource indicator (URI)) into an address box of the web browser, and the web browser may send a server request signal 34 to a server 46 to request content from an event-driven application 30. In particular embodiments, the server 46 may respond to the server request signal 34 by transmitting a server response signal 42 including content corresponding to an event-driven application 30 to the web browser in a client 26. After receiving the content, the web browser may render the content into a viewable form so that it may be displayed to a user 14 through the I/O interface of a client 26.

An event-driven application 30 may provide one more media objects for a user 14 to interact with. As an example and not by way of limitation, an event-driven application 30 may include a web application, a web 2.0 application, an AJAX-based web application, or any other suitable application that provides media objects. In particular embodiments, an event-driven application 30 may be run on a server 46 and interacted with by a user 14 through a browser on a client 26. For example and not by way of limitation, content for an event-driven application 30 may be sent to the web browser in a programming language, and the web browser may render the programming language viewable on a display so that a user 14 may interact with the event-driven application 30. In particular embodiments, an event-driven application may include one or more contents that may be executed by the web browser.

The media objects provided by an event-driven application 30 may be changed (e.g., such as by adding, removing, or modifying the media objects) by one or more events 18 or web flow from the event-driven application 30. As an example and not by way of limitation, a user 14 may enter data using a keyboard, causing the event-driven application 30 to change the media objects provided to the user 14. In particular embodiments, when an event-driven application 30 changes the media objects, the altered media objects may be provided to a user 14 as a new a screen (or state). An event-driven application 30 may include any suitable programming language or combination of programming languages. In particular embodiments, an event-driven application 30 may include source code or object code. In particular embodiments, an event-driven application 30 may include a higher-level programming language, such as, for example, C, Perl, or a suitable extension thereof. In particular embodiments, an event-driven application 30 may include a lower-level programming language, such as assembly language (or machine code). In particular embodiments, an event-driven application 30 may include JAVA. In particular embodiments, an event-driven application 30 may include Hyper Text Markup Language (HTML), Extensible Markup Language (XML), Javascript (JS), Java Server Pages (JSP), Hypertext Preprocessor (PHP), or other suitable markup language.

A network 38 connects one or more clients 26 to one or more servers 46, transporting one or more signals to and from the one or more clients 26 and the one or more servers 46. A network 38 may refer to any interconnecting system capable of transmitting audio, video, signals, data, messages, or any combination of the preceding. A network 38 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. A network 38 may transport any suitable signal for accessing an event-driven application 30 on one or more servers 46. For example and not by way of limitation, a network 38 may transport HTTP signals, FTP signals, or any other suitable signals.

A server 46 may store one or more event-driven applications 30, and may further send and receive signals to and from one or more clients 26 in order to allow a user 14 to access one or more event-driven applications 30 stored in the server 46. As example and not by way of limitation, a server 46 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. In particular embodiments, a server 46 may receive one or more server request signals 34 from a web browser installed on a client 26. In particular embodiments, a server 46 may respond to a server request signal 34 by transmitting a server response signal 42 that includes content corresponding to an event-driven application 30 to a web browser in a client 26. A server 46 may send and receive any suitable signals in order to allow a client 26 to access an event-driven application 30. For example and not by way of limitation, a server 46 may send and receive HTTP signals, FTP signals, or any other suitable signals.

In particular embodiments, an event-driven application 30 may be accessed in different client-tier environments. As example and not by way of limitation, an event-driven application 30 may be accessed in a first client-tier environment that includes a Microsoft Internet Explorer web browser, and the same event-driven application 30 may also be accessed in a second client-tier environment that includes a Mozilla Firefox web browser. In particular embodiments, although the event-driven application 30 may be accessed in both client-tier environments, an end-user experience of the event-driven application 30 may be different on each client-tier environment. In particular embodiments, such differences may be caused by an OS installed on a client 26, a browser installed on a client 26, any other numerous differences in the client-tier environments, or any combination of two or more of these.

Unfortunately, these different end-user experiences may cause problems because an event-driven application 30 may modify the content provided based on one or more events 18 that occur. As an example and not by way of limitation, an event-driven application 30 may modify its content based on a user scrolling over certain content in the event-driven application 30. However, if the content is displayed differently in certain client-tier environments (or not displayed at all) an event 18 may never occur, and the content may not be modified—causing further differences in the end-user experience. As such, even minor differences in an end-user experience may turn into much bigger differences.

Figure 2:
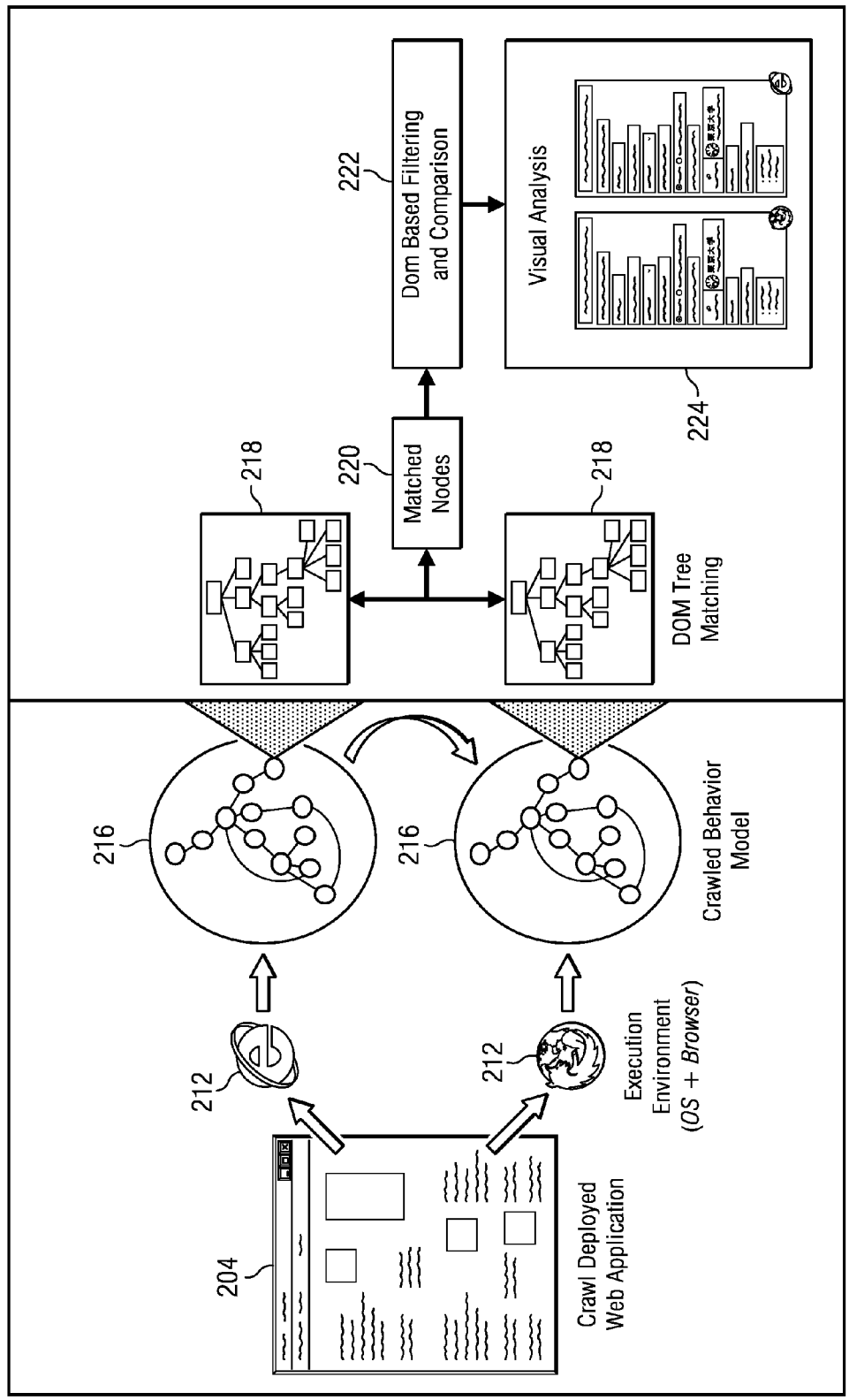
FIG. 2 illustrates an overview of one example embodiment.
Figure 12A:
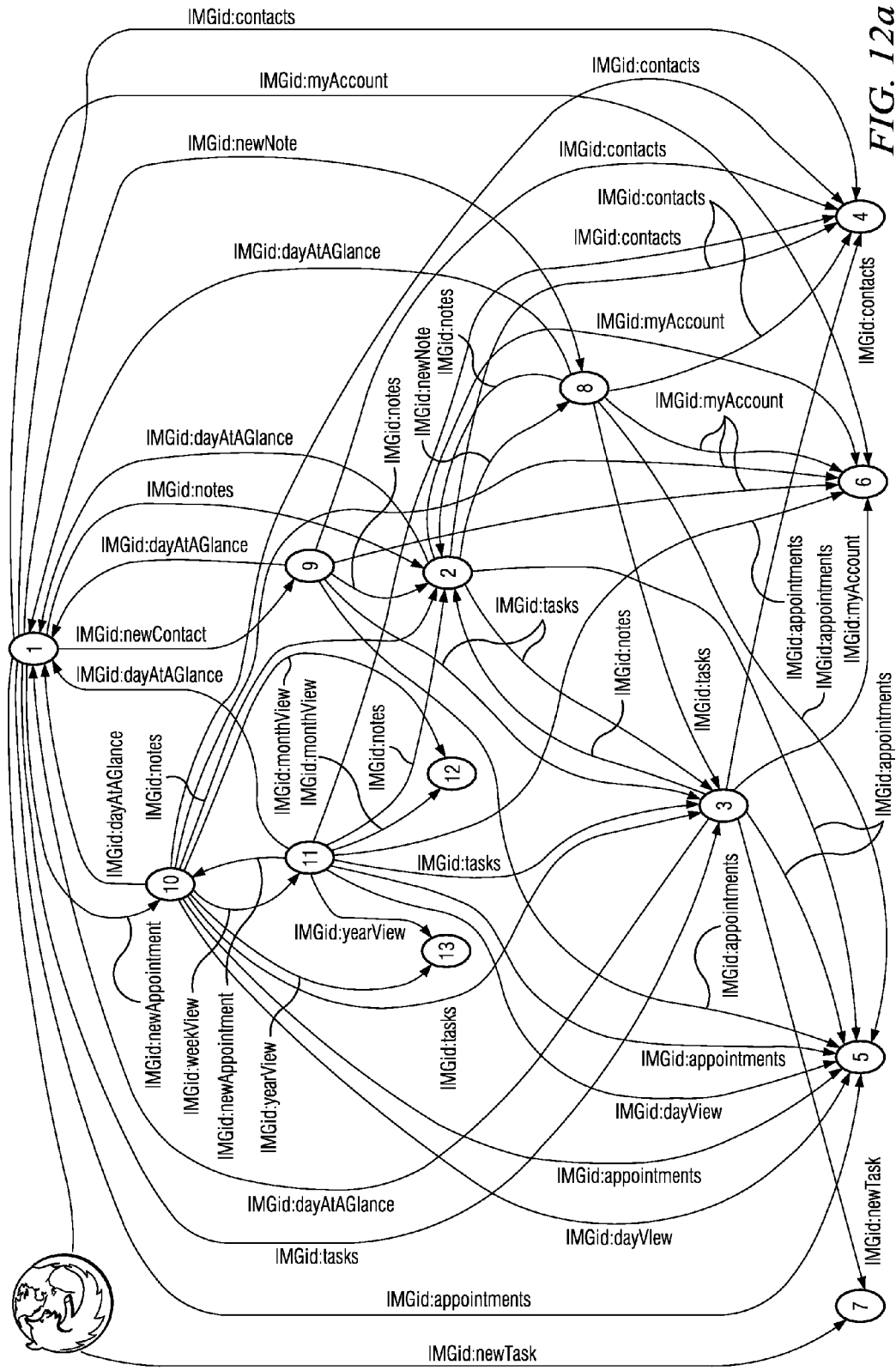
FIG. 12a illustrates an example state graph of the behavioral model generated by dynamically crawling an event-driven application in a first client-tier environment.
Figure 12B:
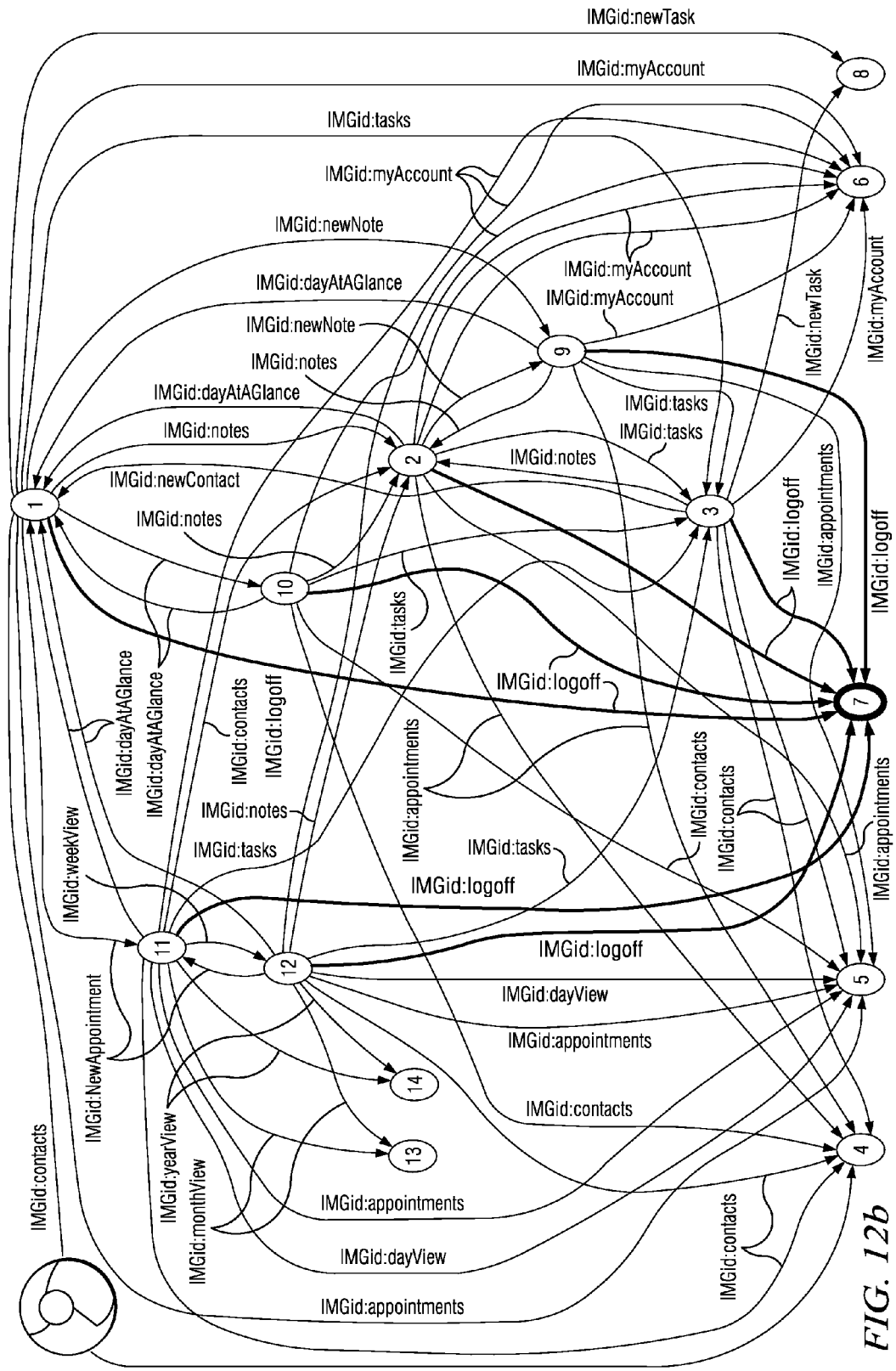
FIG. 12b illustrates an example state graph of the behavioral model generated by dynamically crawling the same event-driven application in a second client-tier environment.

FIG. 2 illustrates an overview of one example embodiment. Event-driven application 204 is crawled in a plurality of client-tier environments 212 to generate one or more behavioral models 216. In some embodiments, behavioral model 216 may represent a state graph. In some embodiments, a corresponding state graph may be extracted from each behavioral model 216. FIGS. 12a and 12b illustrate example state graphs of behavioral models generated for an example event-driven application in two different client-tier environments. States that match across the behavioral models 216 (i.e., S2, S2') are identified. These steps are further illustrated in FIG. 3.

In some embodiments, for each matching pair of states, a structured representation (e.g., DOM tree) 218 of the state of the event-driven application for the corresponding client-tier environment is generated. If the identified states (S2, S2') are not the initial states, then for each matching state, structured representations of a previously-compared matching pair of prior states (S1, S1') are retrieved. The set of nodes 220 of the structured representations in S2, S2' that have not changed since S1, S1' are identified—these nodes are pruned 222 from the following visual differencing steps, thereby increasing efficiency and reducing the number of costly visual comparisons required.

Visual differencing 224 is then performed upon the remaining nodes in S2 and S2' to identify any meaningful differences between the behavior of the event-driven application in each client-tier environment. Such meaningful differences may then be identified as acceptable differences between the client-tier environments or as errors.

Figure 3:
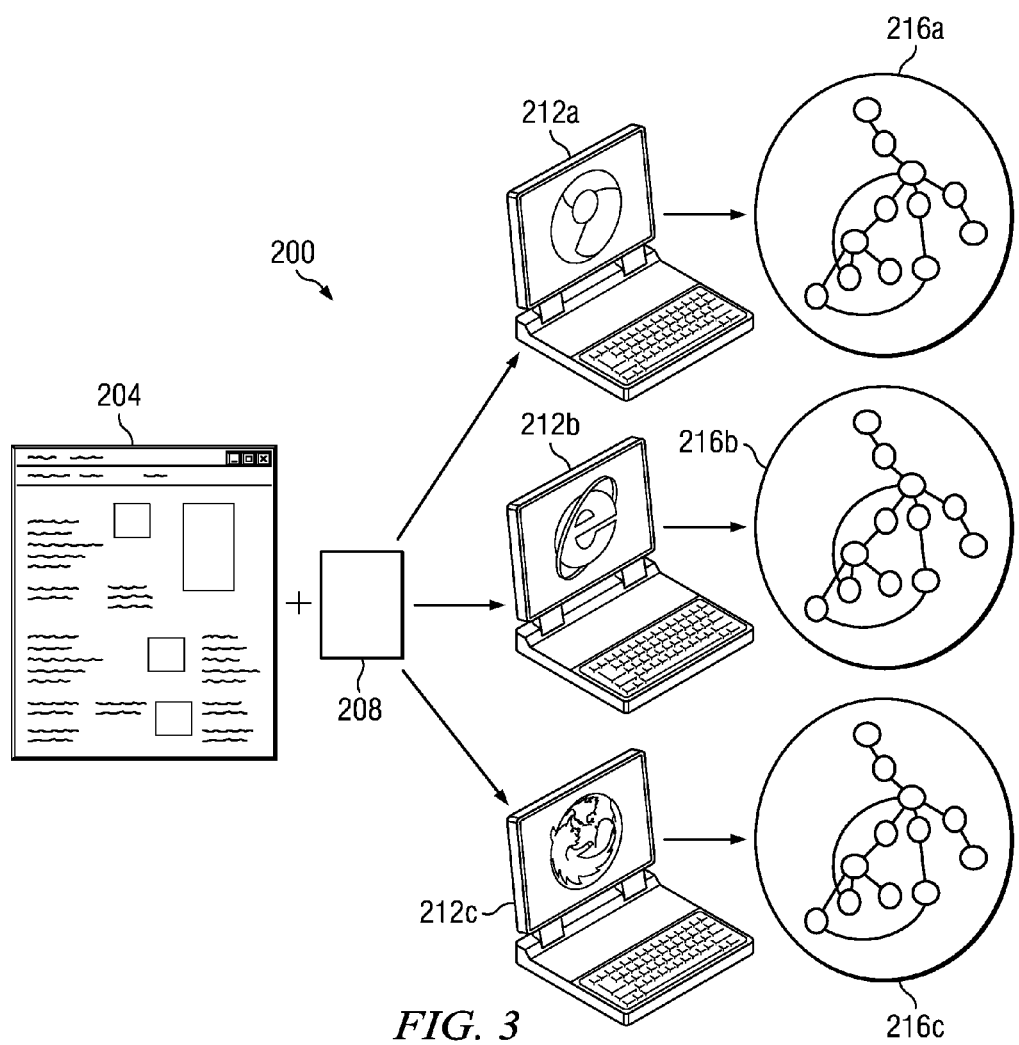
FIG. 3 illustrates an example system for generating one or more behavioral models of an event-driven application.

FIG. 3 further illustrates an example embodiment 200 for generating one or more behavioral models 216 of an event-driven application 204. In particular embodiments, a behavioral model 216 may be generated for an event-driven application 204 in a plurality of client-tier environments 212 using one or more crawlers 208. As such, the behavioral models 216 may be generated automatically and dynamically.

An event-driven application 204 of FIG. 3 may be similar to an event-driven application 30 of FIG. 1. As such, an event-driven application 204 may provide one or more media objects for a user to interact with.

A crawler 208 may dynamically crawl an event-driven application 204. In particular embodiments, the dynamic crawl of a crawler may allow a crawler 208 to dynamically analyze an event-driven application 204 in order to generate a behavioral model 216. As example and not by way of limitation, a crawler 208 may include Crawljax or any other suitable crawler. In particular embodiments, a crawler 208 may exercise code on a client (e.g., such as client 26 of FIG. 1) in order to detect and execute one or more doorways (e.g., clickables) of an event-driven application 204. As such, in particular embodiments, a crawler 208 may dynamically analyze one or more screens of an event-driven application 204 that are rendered by the web browser on a client. Furthermore, a crawler 208 may analyze how the one or more executed doorways affect the one or more rendered screens of an event-driven application 204. In particular embodiments, this may involve initiating (or firing) one or more events, such as events 18 of FIG. 1 (e.g., clicking on a mouse, typing on a keyboard), in order to analyze how such events affect the dynamic DOM tree in a browser before and after the event is replicated. In particular embodiments, by analyzing and storing the effects that occur before and after each of the replicated events, a crawler 208 may incrementally build a behavioral model 216 for an event-driven application 204.

A client-tier environment 212 may allow one or more event-driven applications 204 to be accessed at a client. In particular embodiments, a client-tier environment may be similar to a client-tier environment of FIG. 1. As an example and not by way of limitation, a client-tier environment 212 may include an operating system (OS) installed on a client, a web browser installed on a client, one or more settings of a client (e.g., such as the screen resolution of a monitor of a client), one or more variations in the web browser installed on a client (e.g., the version and configuration of the web browser, including one or more web browser plug-ins and one or more web browser settings), or any combination of two or more of these.

According to the illustrated embodiment, system 200 includes three client-tier environments 212. In particular embodiments, each of the client-tier environments 212 may be different. For example and not by way of limitation, a client-tier environment 212a may include a Windows® Vista OS and a Google® Chrome web browser; a client-tier environment 212b may include a Windows® XP OS, a Microsoft® Internet Explorer web browser, and a particular screen resolution; and a client-tier environment 212c may include a UNIX® OS, a Mozilla Firefox web browser, and one or more plug-ins for the web browser. Although system 200 illustrates three client-tier environments 212, system 200 may include more than three client-tier environments 212 or less than three client-tier environments 212. As an example and not by way of limitation, system 200 may include two or more client-tier environments 212.

According to the illustrated embodiment, a crawler 208 may dynamically crawl an event-driven application 204 in each of the client-tier environments 212 in order to analyze the event-driven application 204. Accordingly, a crawler 208 may generate a behavioral model 216 for each client-tier environment 212. In particular embodiments, the crawling conducted by a crawler 208 may be performed in an identical fashion for each client-tier environment 212. As an example and not by way of limitation, a crawler 208 may initiate the same events (and do so in the same order) while crawling the event-driven application 204 on each client-tier environment 212. As such, the only differences in the behavioral models 216 (if there are any at all) may be caused by the different client-tier environments 212. In particular embodiments, the crawling conducted by a crawler 208 may be automatic. As an example and not by way of limitation, a crawler 208 may be initiated for a particular event-driven application 204 in a particular client-tier environment 212, and the crawler 208 may perform the entire crawl (including the analysis and behavioral model 216 generation) for that particular event-driven application 204 in the particular client-tier environment 212 without any further prompting.

A behavioral model 216 may be generated based on the analysis conducted by a crawler 208 on an event-driven application 204. According to the illustrated embodiment, system 200 includes three behavioral models 216—one behavioral model 216 for each client-tier environment 212.

Figure 4:
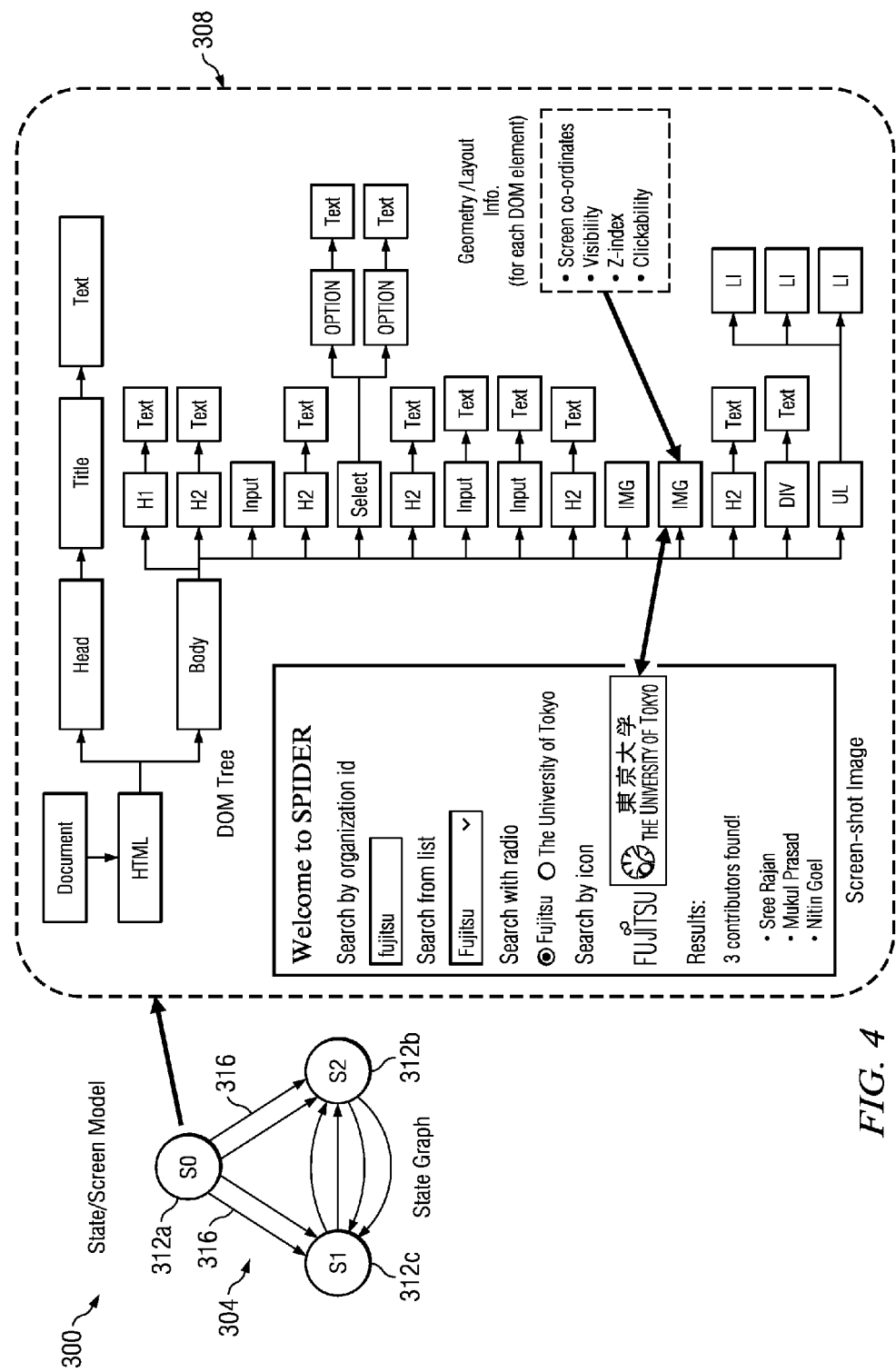
FIG. 4 illustrates an example behavioral model generated by dynamically crawling an event-driven application in a client-tier environment.

FIG. 4 illustrates an example behavioral model 300 generated by dynamically crawling an event-driven application in a client-tier environment. A behavioral model 300 of FIG. 4 may be similar to a behavioral model 216 of FIG. 3.

In particular embodiments, a behavioral model 300 may be generated by dynamically crawling an event-driven application in a client-tier environment, as is discussed with respect to FIG. 3. For example, a behavioral model 300 may be generated by a crawler, such as a crawler 208 of FIG. 3.

In particular embodiments, a behavioral model 300 may be a finite state machine (FSM) with partial transition functions. As an example and not by way of limitation, a behavioral model 300 may include each of the states of the event-driven application, and each of the transitions that caused each of the states. In particular embodiments, a state of a behavioral model 300 may refer to a screen observed by a user when the event-driven application is accessed in a particular client-tier environment. In particular embodiments, a transition may refer to an event (e.g., clicking a mouse, moving a mouse, pressing one or more keys on a keypad) that caused the observed screen (or state) to change. A behavioral model 300 may include a state graph 304 and a set of one more state/screen models 308 for one more states of the state graph 304. In the example shown in FIG. 4, state graph 304 includes three nodes 312a, 312b, and 312c (S0, S1, and S2), each of which correspond to a state/screen model 308. Nodes 312a, 312b, and 312c are connected within state graph 304 via edges 316.

A state graph 304 may include a graphical representation of the finite-state machine with the states represented as unnamed vertices. In particular embodiments, a state graph 304 captures the set of traces (e.g., alternating sequences of events and screen transitions caused by the events) without reference to the details of each state. In particular embodiments, a state graph 304 may be a labeled, directed graph, with a special designed start vertex. It may be denoted by a 5-tuple, G (V, E, o, $\Sigma$, L), where V is the set of vertices, E is the set of (directed) edges, o is the special designated start vertex, E is an alphabet of labels, and L:E→$\Sigma$ is a labeling function that assigns a label from $\Sigma$ to each edge. According to the illustrated embodiment, each node 312 in a state graph 304 of a behavioral model 300 may represent a state of a screen of the event-driven application. Furthermore, each edge 316 in a state graph 304 of a behavioral model 300 may represent an event (e.g., such as a user-initiated interaction with an event-driven application) causing a transition from one of the screens to another. In particular embodiments, each edge 316 of a state graph 304 of a behavioral model 300 may be labeled (not shown) with the event that caused the transition between states. In the example shown in FIG. 4, node 312a of state graph 304 corresponds to state/screen model 308—both represent aspects of state S0.

A state/screen model 308 may include a programmatic representation of each state (screen). In particular embodiments, state/screen model 308 captures details of each screen without any knowledge of transitions leading up to or out of the screen. In particular embodiments, state/screen model 308 may include a rooted, directed, labeled tree 322. This tree 322 may be denoted by a 5-tuple, T(Q, D, r, $\Lambda$, $\delta$), where Q is the set of vertices, D is the set of directed edges, r$\in$Q is the root vertex, $\Lambda$ is a finite set of labels and $\delta$:Q→$\Lambda$ is a labeling function that assigns a label from $\Lambda$ to each vertex in Q. In particular embodiments, the tree T 322 may be an abstracted version of the DOM tree of a given state (screen) displayed on a web browser. Further, the screen model 308 may include a screen-shot image representation 318, of the state as viewed in a particular web browser or client-tier environment. In addition, the screen model 308 may contain, for each element E of the tree T 322, a list 320 of geometric and layout properties pertaining to the representation of element E within the image 318. These properties may include the Cartesian co-ordinates of the segment of 318 within which element E is represented, whether or not element E is currently visible in 318 (visibility attribute), whether or not element E is clickable in the screen represented by 308 (clickability attribute) and what layer of the image 318, element E is represented in (the z-index attribute). Although behavioral model 300 illustrates a single state/screen model 308, a behavioral model 300 may include any suitable number of state/screen models 308. As an example and not by way of limitation, a behavioral model 300 may include a state/screen model 308 for every state (screen) of a state graph 304 of a behavioral model 300.

Figure 5:
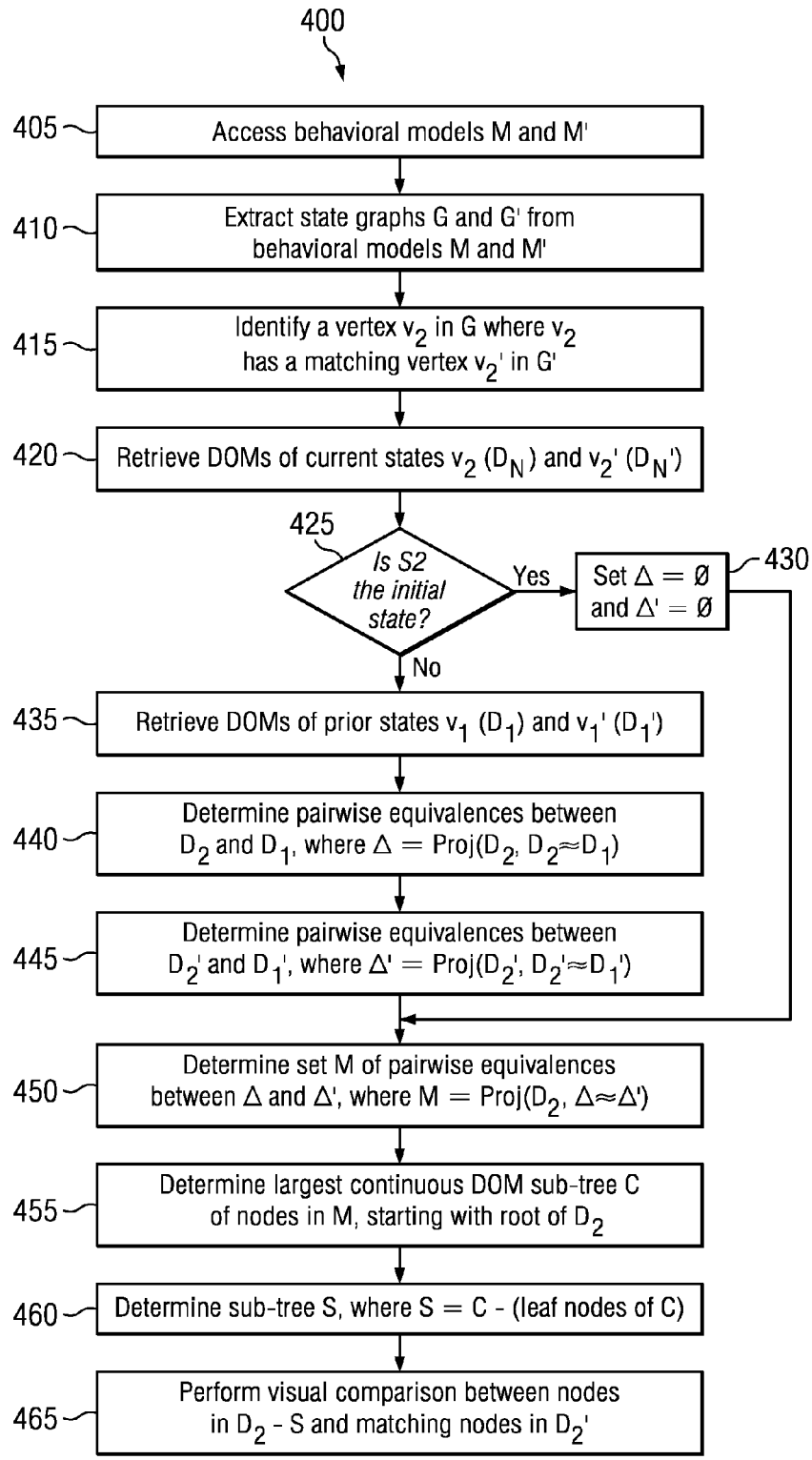
FIG. 5 illustrates an example method for reducing the number of visual comparisons required to determine one or more differences between two screens that are part of, respectively, two behavioral models of an event-driven application.

FIG. 5 illustrates an example method 400 for an efficient technique for determining one or more differences between DOM representations of states of two behavioral models of an event-driven application. In particular embodiments, by determining those portions of the DOM representations of certain states of the two behavioral models that do not differ from one another, the number of visual comparisons that must occur is reduced, and any differences in an end-user experience of the event-driven application in a client-tier environment may be determined more efficiently with respect to one or more other end-user experiences of the event-driven application in one or more other ones of the client-tier environments. In particular embodiments, method 400 may further include determining one or more pairwise equivalences for each of the behavioral models with respect to one or more other ones of the behavioral models.

In step 405, behavioral models M and M' are accessed. Behavioral model M represents the event-driven application in a first client-tier environment, while behavioral model M' represents the event-driven application in a second client-tier environment. In step 410, state graph G is extracted from behavioral model M, and state graph G' is extracted from behavioral model M'. In some embodiments, behavioral models M and M' and/or state graphs G and G' represent portions of functionality provided by the event-driven application.

In step 415, a vertex $v_2$ in G is identified, wherein $v_2$ has a matching vertex $v_2'$ in G'. Vertex $v_2$ represents state S2 of the event-driven application in the first client-tier environment; vertex $v_2'$ represents state S2' of the event-driven application in the second client-tier environment. In particular embodiments, vertex $v_2$ and vertex $v_2'$ may have been identified as matching nodes during a trace-level comparison performed upon behavioral models M and M'.

In step 420, a structured representation ($D_2$) of state S2 of the event-driven application in the first client-tier environment corresponds to the state (e.g., screen) represented by vertex $v_2$. Structured representation $D_2'$ of state S2' of the event-driven application in the second client-tier environment corresponds to the state (e.g., screen) represented by vertex $v_2'$. In some embodiments, structured representations $D_2$ and $D_2'$ may each comprise a DOM tree. In some embodiments, $D_2$ may be retrieved from behavioral model M, and $D_2'$ may be retrieved from behavioral model M'. In some embodiments, a structured representation $D_2$ of state S2 of the event-driven application may comprise a partial representation of state S2.

In step 425, if S2 is not the initial state of state graph G, then in step 435, previously-compared states S1 and S1' are retrieved for both state graphs G and G'. Structured representation $D_1$ of state S1 of the event-driven application in the first client-tier environment corresponds to the state (e.g., screen) represented by vertex $v_1$; structured representation $D_1'$ of state S1' of the event-driven application in the second client-tier environment corresponds to the state (e.g., screen) represented by vertex $v_1'$. In some embodiments, $S_1$ was previously compared to $S_1'$ and found to be pairwise equivalent—by leveraging previously—compared states S1 and S1', unchanged portions of the DOMs D can be eliminated from the subsequent visual comparison operations. States S1 and S2 should share a substantial portion of their content, so that this similarity can be leveraged. There can be several methods of choosing states S1 and S1', with varying trade-offs of computation cost versus the optimality of the choice (the optimal states S1 and S1' would be those that have maximal overlap in terms of content, with S2 and S2'respectively). A simple and efficient heuristic to of choosing S1 and S1' is to choose the states from which S2 and S2' were explored during crawling. These are necessarily counterparts of each other and would have been compared before comparing S2 and S2' and would typically have substantial (though not necessarily maximal) overlap with the content of S2 and S2'.

In step 440, a set of one or more pairwise equivalences between structured representations $D_2$ and $D_1$ is determined with respect to the first client-tier environment and projected onto the DOM $D_2$ to compute set $\Delta$:$\Delta$=Proj($D_2$, $D_2$≈$D_1$). Proj($D_i$, R) is the set of DOM nodes of DOM $D_i$ that appear in some pair of the relation R, where R is a one-to-one symmetric relation between two DOMs $D_j$ and $D_k$ or portions thereof, i.e., R$\subseteq$$D_j$×$D_k$.

In some embodiments, the relation $D_2 \approx D_1$ represents a one-to-one, symmetric relation between $D_2$ and $D_1$, where a pair of DOM nodes $(x,y) \in D_2 \approx D_1$ if and only if $x \in D_2$, $y \in D_1$, and MatchIndex(x,y)=1.

The value of MatchIndex(x,y) may vary between 0 and 1. MatchIndex represents a factor-based comparison of two DOM nodes. MatchIndex(x,y) is described in further detail in FIG. 7.

In step 445, a set of one or more pairwise equivalences between structured representations $D_2'$ and $D_1'$ is determined with respect to the second client-tier environment and projected onto the DOM $D_2'$ to compute set $\Delta'$: $\Delta' = \text{Proj}(D_2', D_1')$.

With respect to step 425, if state S2 is the initial state of the state graph G, then in step 430, both sets of DOM nodes $\Delta$ and $\Delta'$ are determined to be empty sets $\emptyset$. Since there are no states in state graph G prior to S2, there are no pairwise equivalences that can be assessed.

In step 450, a set M of one or more matched DOM nodes is determined, wherein each matched node in M represents a pairwise equivalence between one or more portions of the nodes in set $\Delta$ and one or more corresponding portions of the nodes in set $\Delta'$ and these equivalences are projected onto the DOM $D_2$ to compute the set $M: M = \text{Proj}(D_2, \Delta \approx \Delta')$.

In step 455, the largest connected DOM sub-tree C of nodes in M is determined, starting with root of $D_2$: $C = \text{Cont}(M)$. Given a DOM D corresponding to a web browser screen and a subset M of D (i.e., $M \subset D$ in the set interpretation of D and M), Cont(M) computes the largest connected sub-tree of D (under the structural interpretation of D) that can be formed by the nodes in M, starting from the root node. Note, if the root node of D is not part of M then Cont(M)=$\emptyset$ (empty tree or null set).

In step 460, sub-tree S is determined, wherein S=C-(leaf nodes of C). This step computes those nodes of $D_2$ for which screen-level, visual comparison is not deemed necessary, thereby reducing the overall number of costly visual comparisons that must be performed.

In step 465, the set of nodes in $D_2$-S are submitted for visual, screen-level comparison (i.e., visual differencing) with corresponding nodes in $D_2'$-S. A screen-level comparison may determine one or more pairwise differences between screen models being compared. In particular embodiments, determining one or more pairwise differences between the behavioral models M1 and M2 may include performing a state-level (or screen-level) comparison between corresponding screens T1 from M1 and T2 from M2. This correspondence may have been established previously through an graph isomorphism comparison on the state graphs of M1 and M2. In particular embodiments, the screen-level comparison may include retrieving the DOM tree and Javascript state variables for both state/screen model T1 and state/screen model T2, and attempting to compare them. In particular embodiments, this comparison may yield some differences between the DOMs of T1 and T2 as well as a pairwise matching between other DOM nodes of T1 and T2. Such pairs of matched DOM nodes are then submitted for comparison through visual analysis.

Shown below is one example of an algorithm for performing the visual comparisons:

```
/* CrossBrowserTest */
Input : Map_i, SC_i for browsers Br_O..Br_n,
   Br_O : reference browser
   VN_O : set of variable nodes in Br_O
Output: Mismatch_i between Br_O, Br_i
1  begin
2     SC_O ← grayOutNodes(SC_O, VN_O)
3     for i → 1 to n do /*for all browsers*/
4        Mismatch_i ← ∅
5        VN_i ← getAllMappedNodes(VN_O, Map_i)
6        SC_i ← grayOutNode(SC_i, VN_i)
7        foreach node_j ∈ Map_i, ∉ VN_i do /*Bottom-Up*/
8           node ← getMappedNode(nodes_j, Map_i)
            // Check for positional shifts
9           relDist1 ← relDistToContainer(node)
10          relDist2 ← relDistToContainer(node_j)
11          if dif f (relDist1, relDist2) then
12             parent1 = par ent(node)
13             parent2 = parent(node_j)
14             box1 ← parent1.box
15             box2 ← parent2.box
16             if not VChk(SC_O, SC_i,box1,box2) then
17                insert(Mismatch_i, parent2,
18                   "content shifted")
19             end
20          end
21          box1 E ← node.box
22          box2 E ← node_j.box
23          if visibilityDif f (node, node_j) then
24             insert(Mismatch_i, node_j,
25                "visibility changed")
26          else if size Dif f (node, node_j) then
27             insert(Mismatch_i, node_j, "changed size")
28          else if not VChk(SC_O,SC_i,box1, box2) then
29             insert(Mismatch_i, node_j,
30                "changed appearance")
31          end
32       end
         // Group Issue List
33       Mismatch_i ← clusterNodes(Mismatch_i)
34    end
35  end
/* VChk -- Visual Check */
Input : SC_i, SC_j for browsers Br_i, Br_j
   Box_i, Box_j: Image co-ordinates to compare
Output: Matches : Boolean value indicating a match or a mismatch
1  begin
2     image_i ← crop(SC_i, Box_i)
3     image_j ← crop(SC_j, Box_j)
      // average colors per 100 px^2 image area
4     α ← (numColors(image_i) × 100)/area(Box_i)
      // threshold based on color density and size
5     threshold ← chooseThreshold(α, Box_i)
      // Earth Movers' Distance (EMD)
6     emd ← getE M D (image_i, image_j)
7     if emd ≤ threshold then
8        return true
9     end
10    return false
11 end
```

TABLE I

THRESHOLD VALUES CHOSEN BY CHOOSETHRESHOLD.

|  | Small CD (<1) | Large CD ($\geq$1) |
|---|---|---|
| Small Image (<$10^4$ square pixels) | 1 | 0.5 |
| Large Image ($\geq 10^4$ square pixels) | 2 | 1 |

CrossBrowserTest is the main function in the algorithm. It takes as input, for each browser $Br_i$, its mapping from the reference ($Map_i$), its screen capture information ($SC_i$), and the set of variable nodes in the reference browser ($VN_O$). As a preliminary step, the algorithm "grays out" the areas corresponding to variable nodes in the screenshots for the reference browser to eliminate possible false positives caused by them (line 2). It then processes the data from the different browsers. For each browser, the algorithm first finds the mapped variable nodes in it and grays out the corresponding areas as well (lines 5-6). It then visits the DOM tree nodes from leaves to root (i.e., in a bottom-up fashion). For each DOM node (node$_j$), it gets the corresponding node node in the reference browser, according to the mapping (line 8). The algorithm checks for positional shifts in the DOM node by comparing the relative distances of both node and node$_j$ from their DOM containers (lines 9-10). If it finds such a shift, the technique verifies it in the areas of the screenshots that correspond to the DOM containers by invoking procedure VChk, described below (lines 11-16). If the difference is confirmed by VChk, the relevant DOM node is added to set Mismatch$_i$ (line 17).

Next, the algorithm compares the actual nodes, without considering their containers, for visibility, size, and appearance differences. Visibility and size differences are checked first, so as to limit the number of (more expensive) graphical comparisons. First, the algorithm checks for visibility differences by invoking procedure visibilityDiff and passing node and node$_s$ as parameters (line 23). Procedure visibilityDiff, not shown here for space reasons, mainly compares the visibility attributes of node and node$_j$ and returns a value that indicates whether they match. If they do not match, the algorithm adds node$_j$ in the Mismatch$_i$ set and specifies that the difference relates to visibility. If there is no visibility difference, the algorithm checks for size differences by invoking procedure sizeDiff on node and node$_j$ (line 26). Similarly to visibilityDiff, procedure sizeDiff compares the dimensional attributes of the two nodes and returns a value that indicates whether they match. In case of a mismatch, the algorithm records the difference and its reason (line 27). If both visibility and position match, the algorithm compares the screenshots' graphical areas corresponding to node and node$_s$ using again procedure VChk (lines 28-31).

Also in this case, a mismatch is recorded by adding node$_j$ to set Mismatch$_i$ and specifying that the difference relates to appearance. Finally, the algorithm clusters the information in the Mismatch, set by aggregating differences that occur in neighboring areas on the screen, so that they can be reported together to developers (line 33). The clustering is performed in procedure clusterNodes using the visual coordinates of the nodes in the Mismatch$_i$ set. Other details about clusterNodes are of limited relevance and are not reported for space reasons.

Procedure 'VChk performs the image comparison part of our technique. VChk takes as inputs two screen captures and two bounding boxes—set of coordinates of the graphical areas that must be compared. First, the algorithm extracts the relevant parts of the images from the screen captures (lines 2-3). It then compares the extracted images using the EMD metric. As a threshold for EMD, the algorithm uses different values based on size and color density of the images, where the color density (CD) is computed as the average number of colors per 100 square pixels.

In particular embodiments, the method 400 may be repeated for each pairing of screens from each pairing of behavioral models. As an example and not by way of limitation, if three behavioral models are generated by a crawler for an event-driven application in three different client-tier environments, the method 400 may be repeated in the context of each pairing of the three behavioral models. As such, each trace-level difference (or incompatibility) and each screen-level difference between each of the behavioral models may be determined and outputted. Furthermore, for each of the behavioral models, one or more pairwise equivalences with respect to one or more other ones of the behavioral models may be determined. In particular embodiments, the outputting of the trace-level differences and the screen-level differences may include sorting, classifying, and/or filtering the differences before outputting them.

FIG. 6 illustrates example structured representations of an example event-driven application in two different client-tier environments, wherein each structured representation was generated from one node of a behavioral model (i.e., one state in a state graph). As can be seen from FIG. 6, the structured representation on the right differs slightly with the addition of one extra DIV node not included in the structured representation on the left.

FIG. 7 illustrates an example MatchIndex algorithm for comparing a node in a first structured representation with a node in a second structured representation. As shown in FIG. 7, in this formula, xpath1 and xpath2 correspond to the xpaths of nodes x and y respectively. The function $f$ is a distance function that evaluates the degree of difference between various attributes of DOM nodes x and y, namely the upper left hand corner screen co-ordinates of x and y, and several attributes such as the clickability and visibility attributes as well as a hash value based on the text nodes that are descendents of x and y. Values of function $f$ may range from values 0 to 1. Function $f(\ )=1$ if and only if x and y are identical in terms of all these attributes. One or more of these attributes can be excluded from the computation of $f$, to enable a looser set of criteria for calculating DOM matches. The similarity index xPathSimilarity=1 if and only if nodes x and y have identical xpaths.

In some embodiments, for every DOM node, the following properties are collected (where we call DOM element the web page element associated with the DOM node):

tagname: Name of the tag associated with the DOM element.
id: Unique identifier of the DOM node, if defined.
xpath: X-Path of the node in the DOM structure.
coord: Absolute screen position of the DOM element.
clickable: True if the DOM element has a click handler.
visible: True if the DOM element is visible.
zindex: DOM element's screen stack order, if defined.
hash: Checksum of the node's textual content, if any.

Shown below is one example of an algorithm for MatchIndex (a.k.a. ComputeMatchIndex):

```
/* ComputeMatchIndex */
Input : a, b where a ∈ DOM_i, b ∈ DOM_j
Output: ρ (Match Index)
1    begin
2       α ← 0.9
3       ρ: ρ_1: ρ_2 ← 0
3       if (a.id ≠ "")∧ a.id == b.id then
5           ρ ← 1
6       end
7       else if a.tagname == b.tagname then
8           ρ_1 ← (1— TievenshteinDistance(a.xpath, b.xpath)/
                max(length(a.xpath), length(b.xpath)))
            foreach prop in {"coord", "clickable", "visible", "zindex",
            "hash"} do
14)             if a.prop == b.prop then
11                  ρ_2 ← ρ_2 + 1
12              end
13          end
14          ρ_2 ← ρ_2/5
15          ρ ← (ρ_1 * α + ρ_2 * (1 − α))
16      end
17      return ρ
18   end
```

MatchIndex computes the match index for each pair of nodes passed to it as parameters using these node properties. First, the algorithm checks whether (1) the id is defined, and (2) the two nodes have the same id. If so, it identifies the nodes as a perfect match, assigns 1 to the match index ρ (line 5), and returns the value. (Because ids are manually assigned by developers and are unique, two nodes with the same id are necessarily corresponding nodes in the two DOM trees.) If the ids do not match or are not defined, the algorithm compares the tagnames of the nodes (line 7). Although different nodes can have the same tagname, corresponding nodes cannot have different tagnames. Therefore, if the tagnames are not equal, the default value of $\rho$, zero, is returned. Otherwise, the algorithm computes the matching index using some of the other properties of the nodes. First, the algorithm computes the normalized Levenshtein distance between the xpaths for the two nodes and assigns its ones complement to $\rho_1$ (line 8). Then, the algorithm computes the fraction of properties coord, clickable, visible, zindex, and hash that match between the two nodes, and assign the computed value to $\rho_2$ (lines 9-14). Finally, the algorithm computes the matching index by adding $\rho_1$ and $\rho_2$, suitably weighted (line 15). Because both $\rho_1$ and $\rho_2$ are values between zero and one, the value of the resulting matching index, $\rho$, is also between zero and one. The reason why $\rho_1$ is weighted considerably more than $\rho_2$ in the computation of $\rho$ is because two corresponding nodes should have the same, or at least a very similar, xpath. Intuitively, the other properties are only used to break a "tie" between two very likely matches. There may be only very rare cases in which $\rho_2$ plays any role in deciding a match. In other words, in the absence of developer-defined ids for the nodes, the nodes' xpaths are a reliable indication of whether two nodes match.

Figure 8:
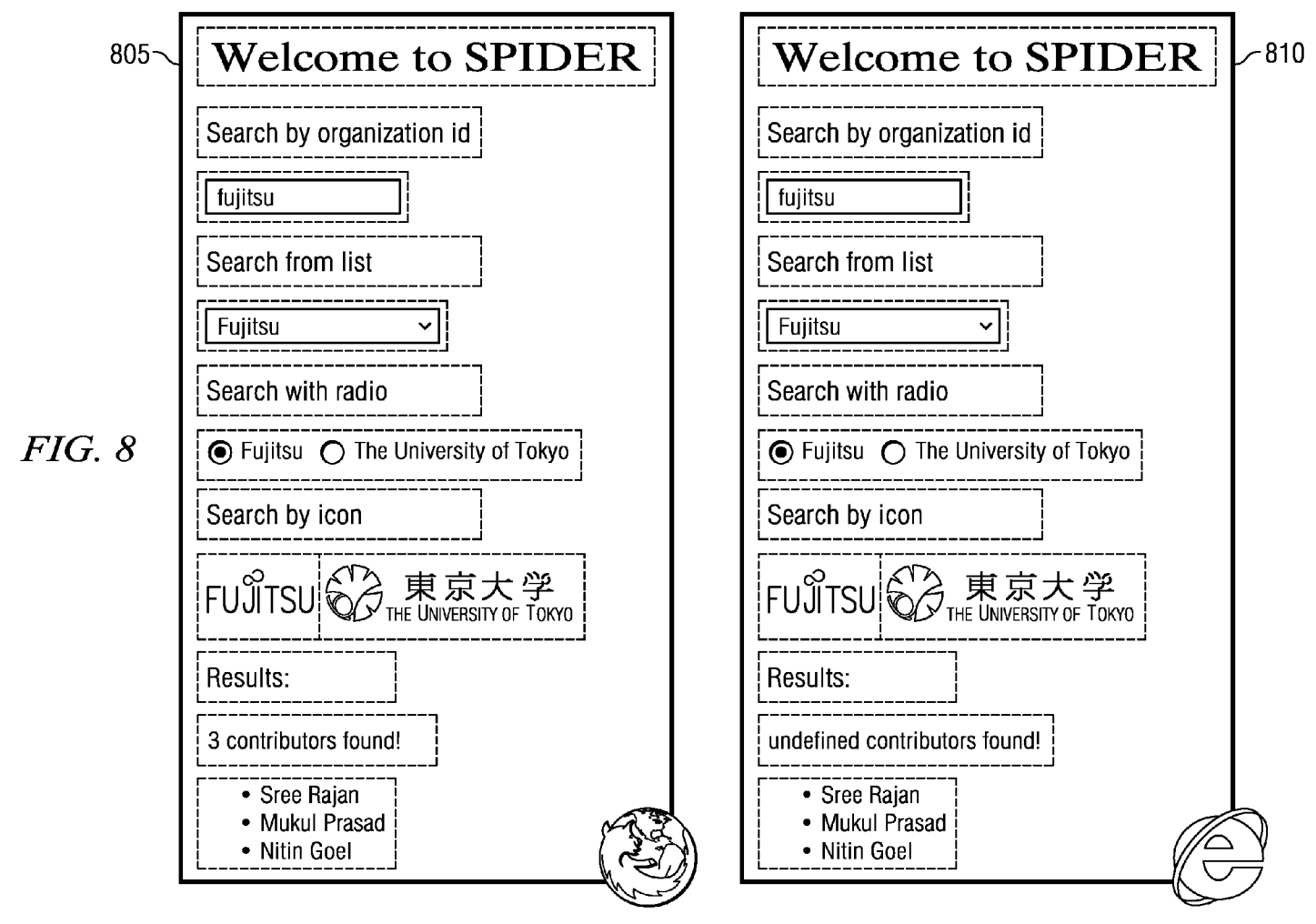

FIG. 8 illustrates two example screens of a state of an event-driven application in two different client-tier environments (Firefox® 805 and Internet Explorer® 810) in relation to the structured representation of the state. As shown in FIG. 8, a screen of one state of the event-driven application has been shown divided into sections corresponding to thirteen nodes in a structured representation of the state.

Figure 9:
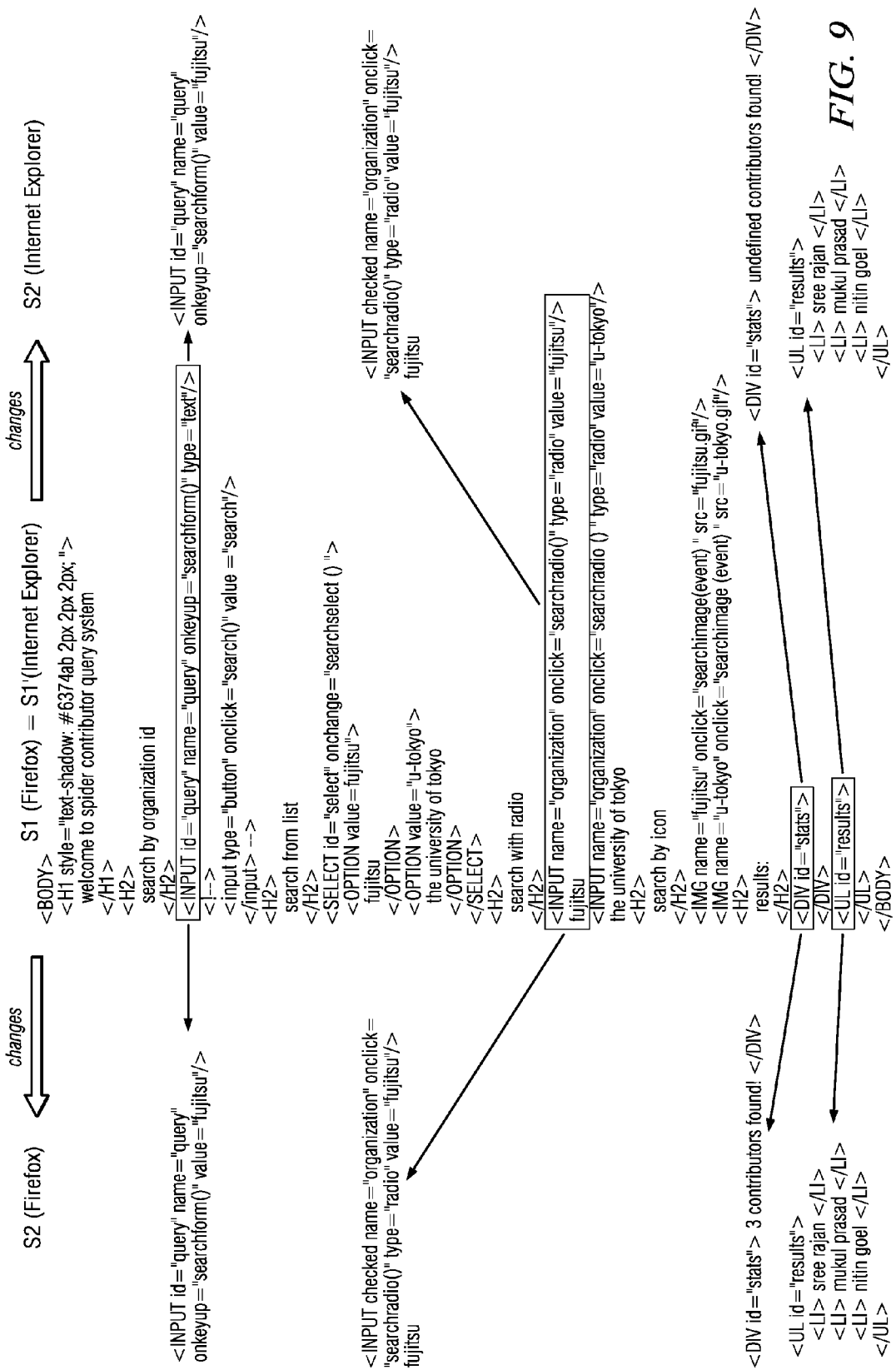
FIG. 9 illustrates a comparison of nodes in a structured representation of two different states (S1 and S2) between two different client-tier environments.
Figure 10:
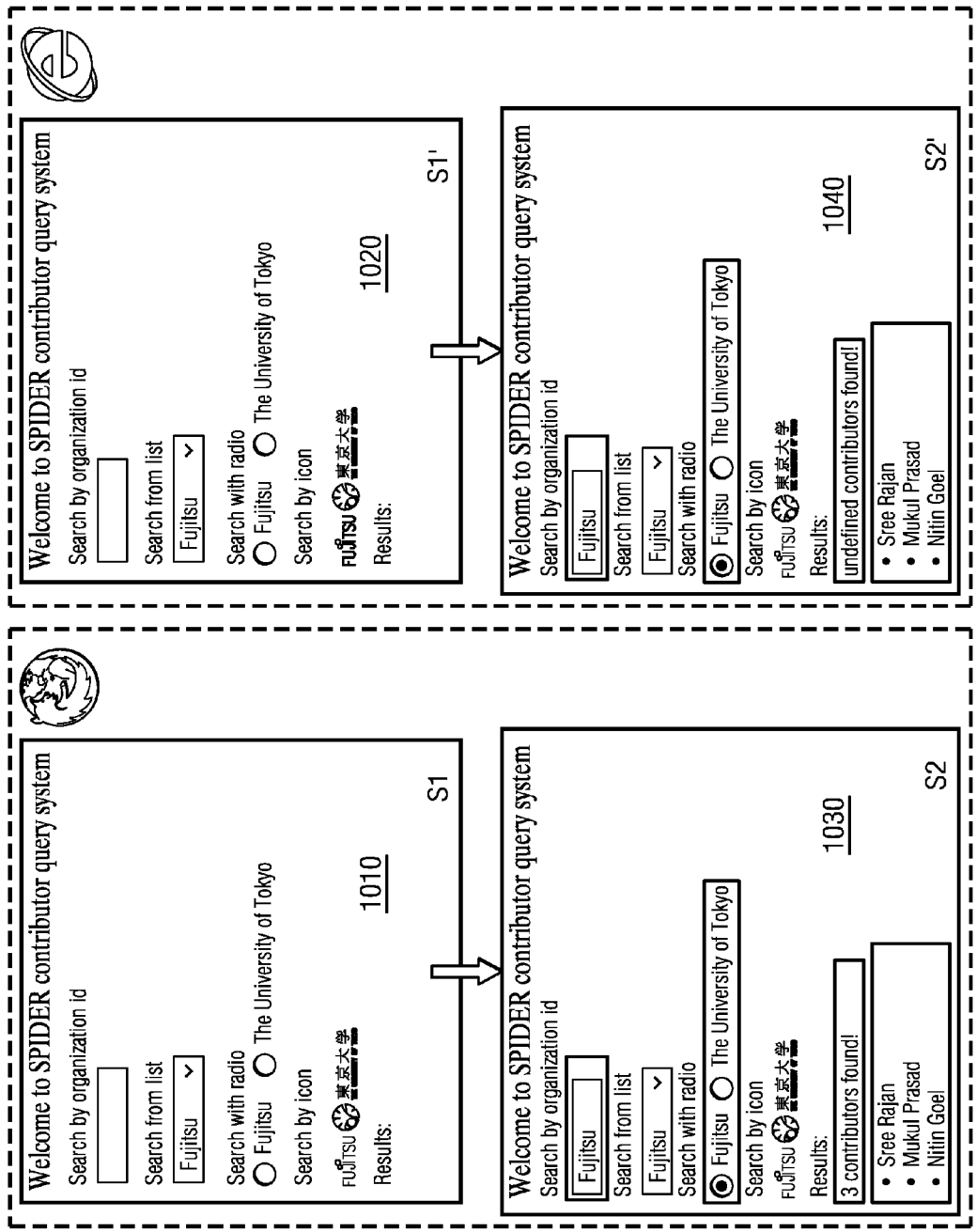
FIG. 10 illustrates a comparison of nodes in example screens of two different states (S1 and S2) between two different client-tier environments.

FIG. 9 illustrates a comparison of nodes in a structured representation of two different states (S1 and S2) between two different client-tier environments. In FIG. 9, comparisons between current state S2 and a previously-compared state S1 are compared to determine portions of the structured representation that were updated from S1 to S2 (and, likewise, the comparison with respect to S2' and S1'). Since S1 and S1' were previously compared and found to be identical, only those four nodes that were updated from S1 to S2 and from S1' to S2' need to be compared for visual differences. FIG. 10 illustrates the comparison described in FIG. 9 in the context of example screens of two different states in two different client-tier environments: previously-compared state S1 in the Firefox® environment 1010, previously-compared state S1' in the Internet Explorer® environment 1020, current state S2 in the Firefox® environment 1030, and current state S2' in the Internet Explorer® environment 1040. As can be seen from FIGS. 9 and 10, the disclosed process resulted in pruning nine of the thirteen nodes in the structured representation, thereby reducing required visual differencing operations to four of thirteen nodes. FIG. 11 illustrates the final identification of the four nodes in the two different client-tier environments (Firefox® 1105 and Internet Explorer® 1110) upon which visual differencing comparisons may be performed.

FIG. 12a illustrates the state graph of an example behavioral model generated by dynamically crawling an event-driven application in a first client-tier environment that includes a Google® Chrome web browser. FIG. 12b illustrates the state graph of an example behavioral model generated by dynamically crawling the same event-driven application in a second client-tier environment that includes a Mozilla Firefox web browser.

Figure 13:
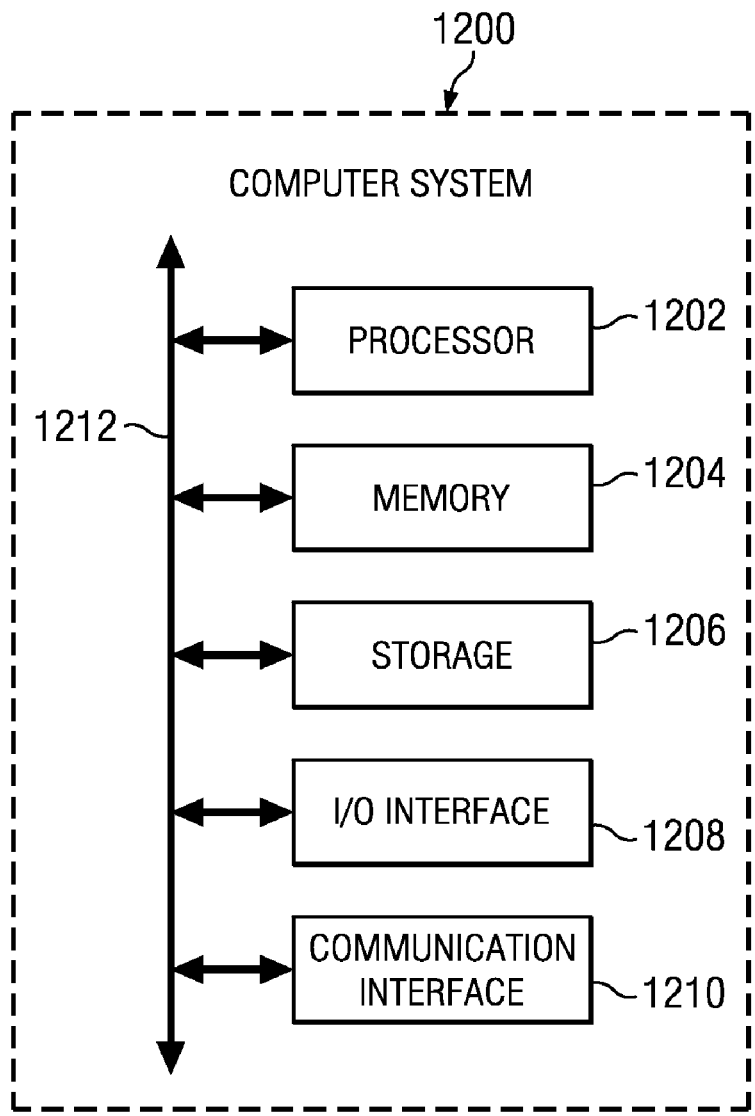
FIG. 13 illustrates an example computer system.

FIG. 13 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1200 may include one or more computer systems 1200; be unitary or distributed; span multiple locations; span multiple machines; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. The present disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. The present disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 712 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include an HDD, a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 1200 and one or more other computer systems 1200 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 1200 to each other. As an example and not by way of limitation, bus 712 may include an Accelerated Graphics Port (AGP) or other graphics bus, an Enhanced industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral. Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C.§101. Herein, reference to a computer-readable storage medium excludes transitory forms of signal transmission (such as a propagating electrical or electromagnetic signal per se) to the extent that they are not eligible for patent protection under 35 U.S.C.§101.

This disclosure contemplates one or more computer-readable storage media implementing any suitable storage. In particular embodiments, a computer-readable storage medium implements one or more portions of processor 1202 (such as, for example, one or more internal registers or caches), one or more portions of memory 1204, one or more portions of storage 1206, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), Javascript (JS), Java Server Pages (JSP), Hypertext Preprocessor (PHP), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computer systems:
    accessing a structured representation of a current state of an event-driven application with respect to a first client-tier environment;
    accessing the structured representation of the current state of the event-driven application with respect to a second client-tier environment;
    determining, using one or more processors associated with the one or more computer systems, that the current state is not an initial state of the event-driven application;
    accessing a structured representation of a prior state of the event-driven application with respect to the first client-tier environment;
    accessing the structured representation of the prior state of the event-driven application with respect to the second client-tier environment;
    determining, using the one or more processors associated with the one or more computer systems, a first set of one or more pairwise equivalences between the current state and the prior state of the event-driven application with respect to the first client-tier environment, wherein the determining comprises finding matches between corresponding portions of the structured representation of the current state and the structured representation of the prior state;
    determining, using the one or more processors associated with the one or more computer systems, a second set of one or more pairwise equivalences between the current state and the prior state of the event-driven application with respect to the second client-tier environment, wherein the determining comprises finding matches between corresponding portions of the structured representation of the current state and the structured representation of the prior state;
    determining, using the one or more processors associated with the one or more computer systems, a set of one or more matched portions between the first set of one or more pairwise equivalences and the second set of one or more pairwise equivalences, wherein each match in the set represents a pairwise equivalence between one or more portions of the structured representation of the current state of the event-driven application with respect to the first client-tier environment and one or more corresponding portions of the structured representation of the current state of the event-driven application with respect to the second client-tier environment; and
    determining, using the one or more processors associated with the one or more computer systems, one or more differences in a reduced set of one or more portions of a first end-user experience of the current state of the event-driven application in the first client-tier environment with respect to a reduced set of one or more portions of a second end-user experience of the current state of the event-driven application in the second client-tier environment, wherein the reduced set of one or more portions of the first end-user experience is determined by eliminating those portions that are included in the set of one or more matched portions.

2. The method of claim 1, further comprising:
    dynamically crawling the event-driven application in the plurality of client-tier environments; and for each of a plurality of client-tier environments, generating a behavioral model of the event-driven application based on the dynamic crawling, wherein a structured representation of a state of the event-driven application is based upon the behavioral model.

3. The method of claim 1, wherein the event-driven application is a web application.

4. The method of claim 1, wherein each client-tier environment comprises:
a particular web browser;
a version of the particular web browser;
a configuration of the particular web browser;
a particular operating system (OS) of a computer system that the particular web browser is running on; and
a screen resolution of a display of the computer system.

5. The method of claim 1, wherein one or more of the differences in the end-user experience of the event-driven application in the client-tier environment are trace-level differences or screen-level differences.

6. The method of claim 1, wherein the behavioral models of the event-driven application comprise state graphs.

7. The method of claim 5, wherein the state graphs are rooted directed graphs.

8. The method of claim 6, wherein:
each node in the state graphs represents a state of a screen of the event-driven application; and
each edge in the state graphs represents a user interaction with the event-driven application causing a transition from one of the states to another.

9. The method of claim 5, wherein the state graphs are finite state machines (FSMs) with partial transition functions.

10. The method of claim 5, wherein determining a pairwise equivalence comprises determining isomorphism between state graphs.

11. The method of claim 5, wherein determining a pairwise equivalence comprises determining isomorphism between states in state graphs.

12. One or more computer-readable non-transitory storage media embodying software that is operable when executed to:
access a structured representation of a current state of an event-driven application with respect to a first client-tier environment;
access the structured representation of the current state of the event-driven application with respect to a second client-tier environment;
determine, using one or more processors associated with the one or more computer-readable non-transitory storage media, that the current state is not an initial state of the event-driven application;
access a structured representation of a prior state of the event-driven application with respect to the first client-tier environment;
access the structured representation of the prior state of the event-driven application with respect to the second client-tier environment;
determine, using one or more processors associated with the one or more computer-readable non-transitory storage media, a first set of one or more pairwise equivalences between the current state and the prior state of the event-driven application with respect to the first client-tier environment, wherein the determining comprises finding matches between corresponding portions of the structured representation of the current state and the structured representation of the prior state;
determine, using one or more processors associated with the one or more computer-readable non-transitory storage media, a second set of one or more pairwise equivalences between the current state and the prior state of the event-driven application with respect to the second client-tier environment, wherein the determining comprises finding matches between corresponding portions of the structured representation of the current state and the structured representation of the prior state;
determine, using one or more processors associated with the one or more computer-readable non-transitory storage media, a set of one or more matched portions between the first set of one or more pairwise equivalences and the second set of one or more pairwise equivalences, wherein each match in the set represents a pairwise equivalence between one or more portions of the structured representation of the current state of the event-driven application with respect to the first client-tier environment and one or more corresponding portions of the structured representation of the current state of the event-driven application with respect to the second client-tier environment; and
determine, using one or more processors associated with the one or more computer-readable non-transitory storage media, one or more differences in a reduced set of one or more portions of a first end-user experience of the current state of the event-driven application in the first client-tier environment with respect to a reduced set of one or more portions of a second end-user experience of the current state of the event-driven application in the second client-tier environment, wherein the reduced set of one or more portions of the first end-user experience is determined by eliminating those portions that are included in the set of one or more matched portions.

13. The method of claim 12, further comprising:
dynamically crawling the event-driven application in the plurality of client-tier environments; and
for each of a plurality of client-tier environments, generating a behavioral model of the event-driven application based on the dynamic crawling, wherein a structured representation of a state of the event-driven application is based upon the behavioral model.

14. The method of claim 12, wherein the event-driven application is a web application.

15. The method of claim 12, wherein each client-tier environment comprises:
a particular web browser;
a version of the particular web browser;
a configuration of the particular web browser;
a particular operating system (OS) of a computer system that the particular web browser is running on; and
a screen resolution of a display of the computer system.

16. The method of claim 12, wherein one or more of the differences in the end-user experience of the event-driven application in the client-tier environment are trace-level differences or screen-level differences.

17. The method of claim 12, wherein the behavioral models of the event-driven application comprise state graphs.

18. An apparatus comprising:
one or more computer-readable non-transitory storage media embodying one or more instructions; and
one or more processors coupled to the media and operable when executing the instructions to:
access a structured representation of a current state of an event-driven application with respect to a first client-tier environment;
access the structured representation of the current state of the event-driven application with respect to a second client-tier environment;

determine that the current state is not an initial state of the event-driven application;

access a structured representation of a prior state of the event-driven application with respect to the first client-tier environment;

access the structured representation of the prior state of the event-driven application with respect to the second client-tier environment;

determine a first set of one or more pairwise equivalences between the current state and the prior state of the event-driven application with respect to the first client-tier environment, wherein the determining comprises finding matches between corresponding portions of the structured representation of the current state and the structured representation of the prior state;

determine a second set of one or more pairwise equivalences between the current state and the prior state of the event-driven application with respect to the second client-tier environment, wherein the determining comprises finding matches between corresponding portions of the structured representation of the current state and the structured representation of the prior state;

determine a set of one or more matched portions between the first set of one or more pairwise equivalences and the second set of one or more pairwise equivalences, wherein each match in the set represents a pairwise equivalence between one or more portions of the structured representation of the current state of the event-driven application with respect to the first client-tier environment and one or more corresponding portions of the structured representation of the current state of the event-driven application with respect to the second client-tier environment; and determine one or more differences in a reduced set of one or more portions of a first end-user experience of the current state of the event-driven application in the first client-tier environment with respect to a reduced set of one or more portions of a second end-user experience of the current state of the event-driven application in the second client-tier environment, wherein the reduced set of one or more portions of the first end-user experience is determined by eliminating those portions that are included in the set of one or more matched portions.

19. The method of claim 18, wherein the event-driven application is a web application.

20. The method of claim 18, wherein each client-tier environment comprises:

a particular web browser;

a version of the particular web browser;

a configuration of the particular web browser;

a particular operating system (OS) of a computer system that the particular web browser is running on; and a screen resolution of a display of the computer system.

* * * * *